Aug. 9, 1927.

W. A. STUART

BLAST FURNACE

Original Filed Dec. 27. 1924

Re. 16,697

3 Sheets-Sheet 1

INVENTOR

Wallace A. Stuart by Hynes Stebbins & Parmele his attorneys

Aug. 9, 1927.

W. A. STUART

BLAST FURNACE

Original Filed Dec. 27. 1924

Re. 16,697

3 Sheets-Sheet 2

INVENTOR

Wallace A. Stuart by Byrnes, Stebbins & Parmelee his attorneys

Aug. 9, 1927. W. A. STUART Re. 16,697

BLAST FURNACE

Original Filed Dec. 27, 1924 3 Sheets-Sheet 3

INVENTOR

Wallace A. Stuart by Byrne, Stetson, Parmelee his Attorneys

Reissued Aug. 9, 1927. REISSUED Re. 16,697

UNITED STATES PATENT OFFICE.

WALLACE A. STUART, OF CLEVELAND, OHIO, ASSIGNOR OF ONE-HALF TO BROOKE L. JARRETT, OF SEWICKLEY, PENNSYLVANIA.

BLAST FURNACE.

Original application filed December 27, 1924, Serial No. 758,483. Continued and application filed January 26, 1926, Serial No. 83,847. Original No. 1,632,633, dated June 14, 1927. Application for reissue filed June 27, 1927. Serial No. 201,943.

This invention relates to blast furnaces and the like, and more particularly to the construction of a heat resistant lining therefor, the invention constituting a continuation of the invention shown in my application, Serial No. 758,483, filed December 27, 1924.

Blast furnaces as usually constructed are considerably wider at their bases than at their tops, being of gradually decreasing diameter upwardly. They generally have an exterior metal shell within which is a refractory wall or lining built up of specially formed blocks or refractory bricks. This lining, in order to have a maximum strength, should have the blocks set as close to each other as possible, and the blocks in each course and row of the wall should break joints with the blocks of adjacent courses and rows in every possible direction. Furthermore, the inner face of the furnace must be kept as smooth and even as possible, notwithstanding the gradual increase in diameter of the furnace.

Because of the non-uniform diameter of the structure, it has heretofore been impossible, with the blocks adopted as the standard, to systematically build up the wall and decrease its diameter without spacing the blocks to an extent entirely inconsistent with what would be tolerable as sound practice in ordinary straight wall masonary, and it has been impossible to break the joints to the extent desirable for maximum strength, especially under the pressure and thermal conditions existant in a blast furnace.

According to the present invention, it is proposed to provide a lining construction wherein the blocks may be most efficiently spaced with respect to each other to insure the breaking of all joints and provide for the uniform setting of blocks notwithstanding the non-uniform diameter of the structure.

A further important purpose of my invention is to provide blocks and a method of laying the same wherein the symmetrical decrease of diameter from the base up may be secured, and wherein the number of blocks of different shapes is minimized, eliminating any requirements for special shapes for the standard lining construction or any necessity for a great number of individually different blocks.

A further important object of the invention is to provide a wall structure in furnaces which can be assembled with greater ease and accuracy than walls of the present type.

According to my invention, it is also proposed that the blocks, for convenience of handling, may be of dimensions approaching those now commonly used.

The invention may be readily understood by reference to the accompanying drawings, wherein—

Figure 1:
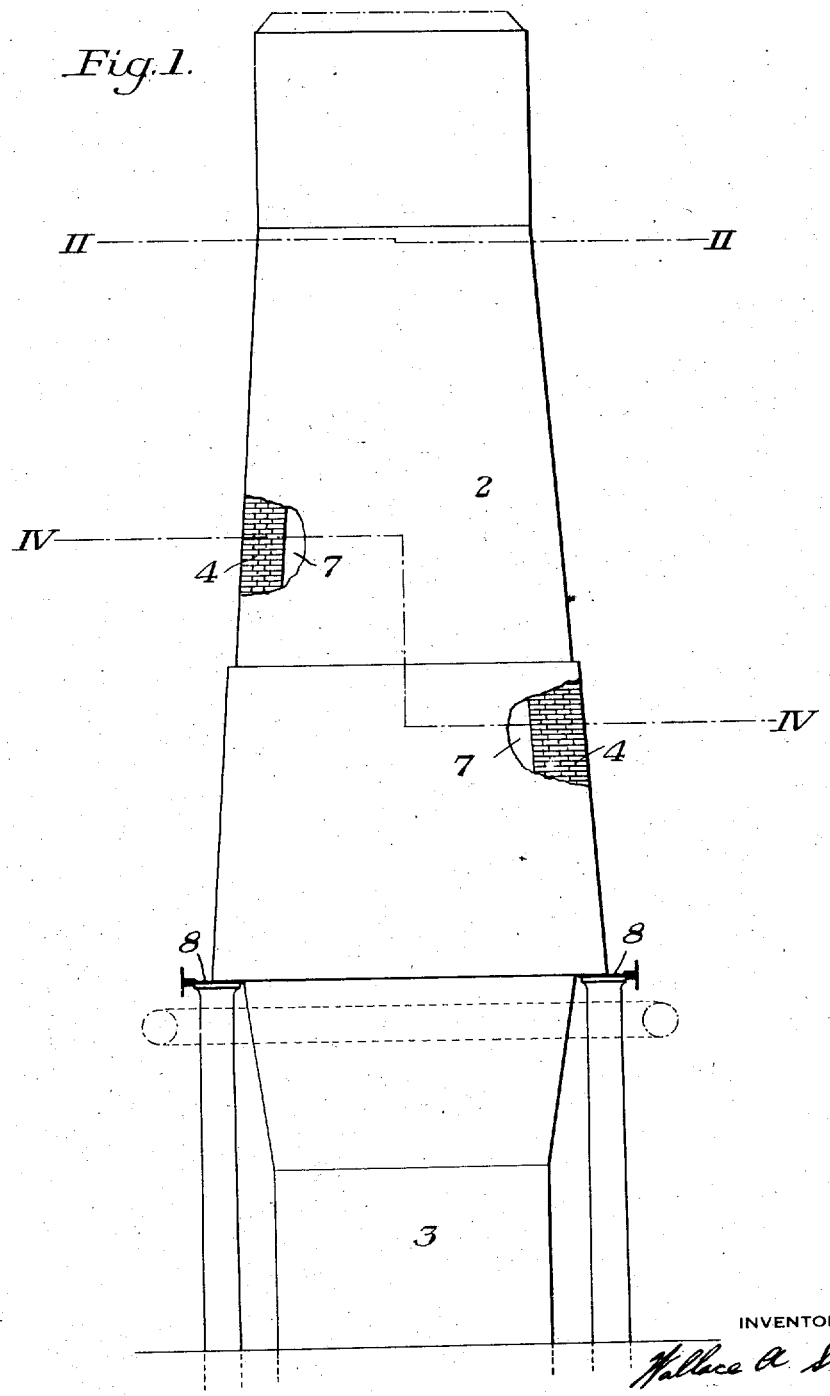
Figure 1 is a diagrammatic side elevation of a blast furnace having a lining embodying the present invention therein, portions of the furnace being represented as being broken away to show the lining.

In the drawings, 2 designates the shell of a blast furnace having a base portion 3. The shell has a lining 4 embodying the present invention comprised of several concentric rows of blocks so arranged in horizontal courses that all of the joints break with the joints of adjacent blocks.

In practice, the blocks will preferably have the lengths now commonly adopted as standard. For instance, as a matter of general practice, the blocks are made in nine inch and thirteen and a half inch lengths and the longer and shorter blocks in the different concentric rows are staggered to break joints.

In accordance with my present invention, I have, in each concentric row, key blocks 5 and straight blocks 6. To determine the width of the key blocks for the inner row, I take as a base dimension, the smallest internal diameter of the furnace cavity 7. I find the circumference of the circle whose diameter is equal to this dimension, and divide this into an equal number of parts whereupon the width of the inner face of the key brick is obtained. In dividing, I take a number which will give me a brick of a dimension comparable to the standard furnace lining brick so that the blocks can be easily handled. The sides of the blocks are radial to the center of the circle having the base diameter. The blocks for each concentric row will have an inner end whose width is equal to the outer dimension of the adjacent inner brick, the key bricks in the outer rows also having radial sides.

This one set of key blocks is sufficient as long as the structure is of the minimum diameter, but obviously would not, in themselves, be sufficient where the diameter of the cavity exceeds the base diameter. In the present invention, I take into consideration the fact that with each increase or decrease of one inch in diameter, there is an increase or decrease of 3.1416 inches in the circumference, the circumference being equal to the diameter times Pi.

I, therefore, make straight sided filler blocks 6 to be used with the increase in diameter the width of which bears a definite ratio to Pi. Obviously the width of the straight blocks 6 could be Pi., but for convenience and in order to make the key blocks and straight blocks of more uniform size and more nearly comparable to the size of present blocks, I preferably make the blocks 6 equal to Pi. plus a simple fraction thereof, preferably one and a half times Pi.

In using the blocks 6, one straight block will be added every time the diameter increases one inch, provided the width of the straight block were Pi., or a straight block will be added to each row in each course with every increase in diameter of an inch and a half in the diameter if the width of the straight blocks is one and a half times Pi.

As a specific illustration, the normal smallest diameter in a blast furnace is twelve feet. I divide a circle having a twelve foot diameter into ninety-six parts, obtaining a dimension of 4.71 for the width of the inner face of the key brick. This dimension is one and a half times Pi. I adopt the same dimension as the width of the straight blocks 6 so that for every increase in diameter of one and a half inches, there is added to the ninety-six key blocks one straight block.

In laying the blocks, it is preferable that instead of decreasing or increasing the diameter in steps of one and a half inches, that several horizontal courses be laid in which there is the same number of blocks and in gradually decreasing the spacing between adjacent blocks. In circles of the diameters found in blast furnace work, the variation of an inch and a half in diameter can be very easily arranged for without any substantial variation in the space between adjacent blocks.

It will be apparent from the foregoing that with each increase of one and a half inches of diameter there is added one straight block, so that when a diameter of fifteen feet, for instance, is reached, there will be added twenty-four straight blocks. Obviously all of these straight blocks could not be disposed side by side, but they must be interposed between the key blocks to the best advantage.

In the laying of a lining, the work is, of course, started at the bottom, and the wall built, the lower part expanding to a portion of maximum diameter at the bosh 8. Above this point the furnace decreases in diameter for a considerable distance upwardly. The first course is laid with the necessary number of straight blocks and the fixed number of key or segmental blocks common to every course in the inner row and with the concentric outer rows. The number of blocks in the outer rows corresponds to the number in the inner row inasmuch as the key blocks in the outer rows preferably have an inner width equal to the outer width of the adjacent blocks in the next inner row, but with the straight blocks of uniform size throughout. The blocks in each outer row break joints with the adjacent inner row a distance equal to one-half the width of the key blocks of the inner row. The key and straight blocks are distributed around the circle as evenly as possible.

Other courses are laid on the first. In building a wall of increasing diameter, as in the lower part of the furnace, the blocks in the courses are spaced further apart until the diameter has been gradually expanded the necessary fixed increment when another straight block is added. In building the portion of the wall of decreasing diameter, the reverse process is followed, the blocks of the courses being more closely spaced until the diameter has decreased the given increment when a straight block can be removed. In the laying of all courses of the same number of blocks, the blocks are so placed that the vertical transverse joints will be shifted with respect to the joints of adjacent courses a distance less than half the width of a block, gauging always from the same edge of the blocks. A shift of about one-quarter a block is preferable.

Figure 2:
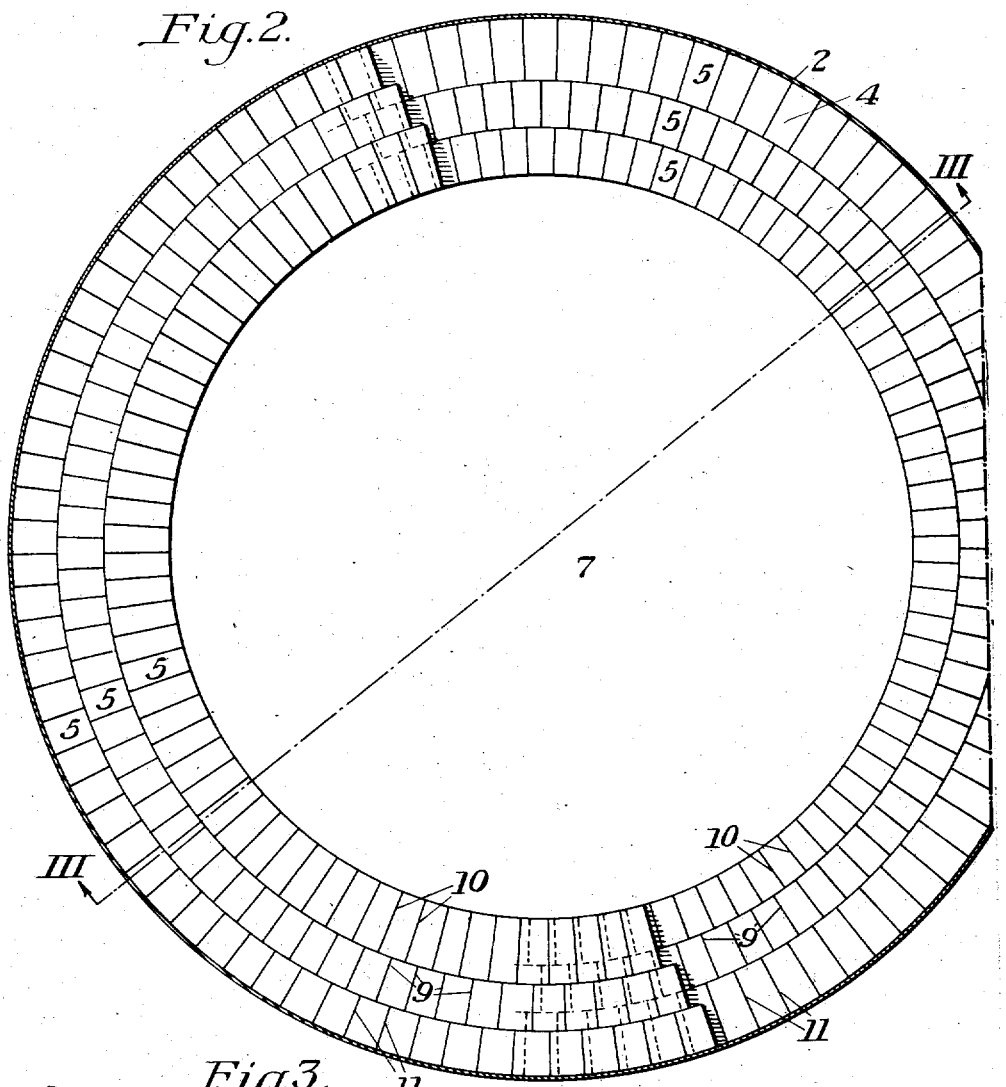
Figure 2 is a staggered horizontal section in the plane of line II—II of Figure 1.
Figure 3:
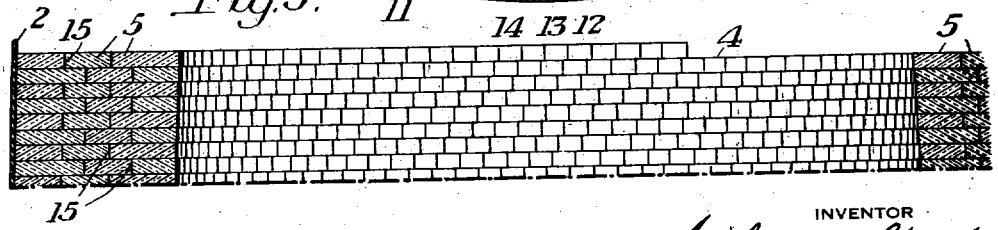
Figure 3 is a vertical section through a portion of the wall, the section being taken on line III—III of Figure 2.

This may be easily followed in Figures 2 and 3 where lines 9 are half-way between lines 10 and 11 in a transverse direction and lines 12 are shifted a quarter width with respect to lines 13 and 14. In this manner, the vertical joints in each direction will break throughout the wall structure. The joints between rows also break, as shown by lines 15 in Figure 3, due to the staggering of blocks of different lengths in the respective rows.

Figure 4:
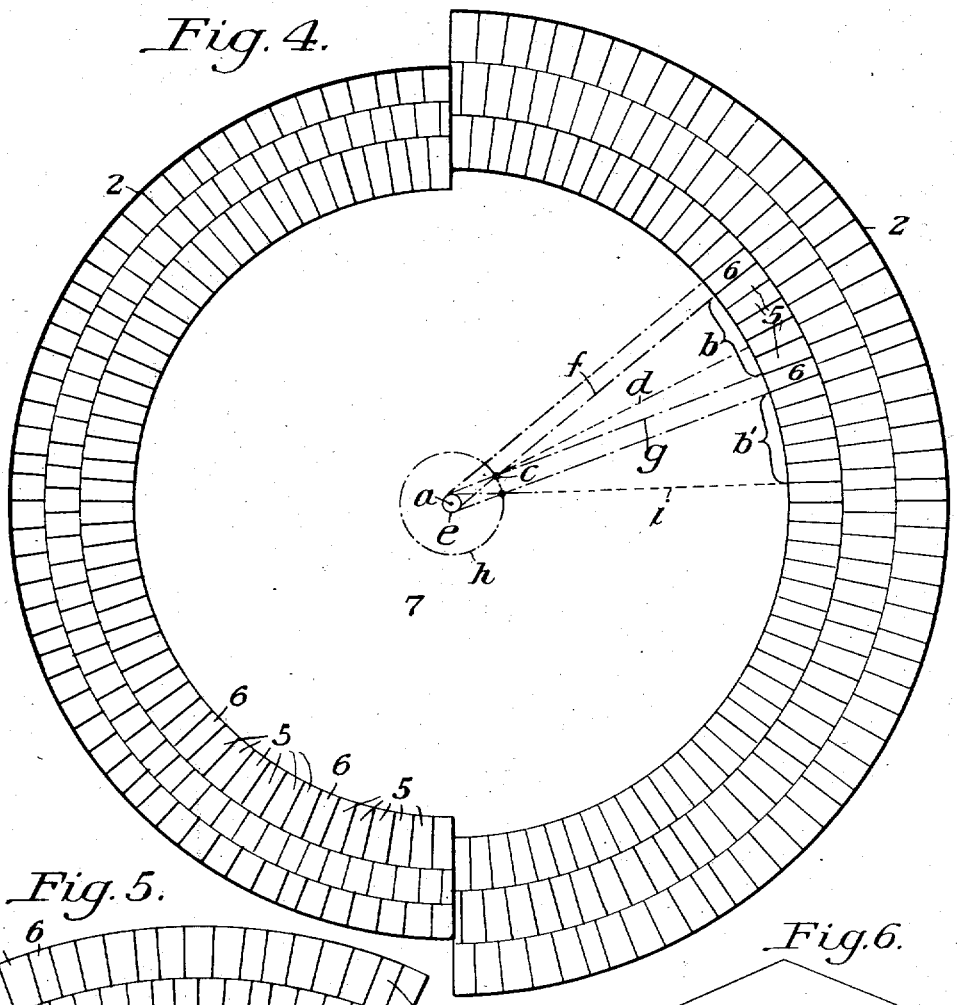
Figure 4 is a staggered horizontal section in the plane of line IV—IV of Figure 1.
Figure 5:
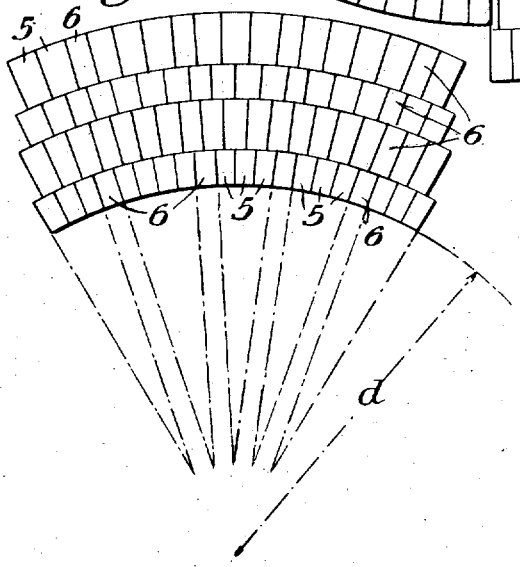
Figure 5 is a partial section through another portion of the wall structure wherein there are four rows of blocks.
Figure 6:
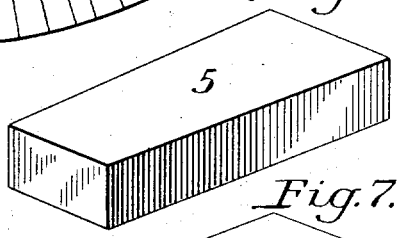
Figures 6 and 7 are perspective views of key and straight blocks, respectively.
Figure 7:
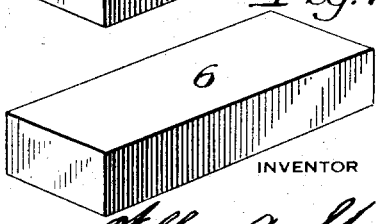

As previously stated, the straight bricks are distributed among the key bricks in each course and row as uniformly as possible. Thus, the lining may be built up evenly and rapidly. In Figure 4 I have illustrated the symmetrical manner in which the wall is developed. The blocks in braces *b* and *b'* are separate groups of key blocks 5 with a straight block 6 at the end of each brace In this view, I have indicated the radius of the base circle from which the dimension of the key blocks is determined as *d* while *a* is the center of the furnace. Lines *f*, *g* and *i* are projected from the sides of straight blocks toward the centers of curvature *c* of the blocks in braces *b* and *b'*. These lines, it will be noted, are substantially tangent to a concentric circle *e* whose diameter is the width of a block 6. It will also be noted in this view how the centers *c* fall on a circle *h* whose diameter is equal to the distance between the actual diameter of the structure and the diameter of the base circle, thereby showing the uniformity with which the structure may be developed. The inner faces of the key or segmental blocks may be curved or straight, as desired.

From the foregoing, it will be apparent that the lining of the structure may be systematically developed with a minimum number of sizes of blocks and with assurance that all vertical joints will break with those of adjacent blocks. The only joints not being broken are those between courses where the vertical weight of the superimposed structure renders the breaking of joints unnecessary. There is little fitting of the blocks required, so that the bricklayer may proceed rapidly, thereby effecting a considerable saving in the labor costs. The blocks are closely positioned with respect to one another, thereby increasing the strength of the wall and providing a structure wherein a greater life is secured by reason of the fact that the maximum resistance is established to penetration of gases and other substances.

Another important advantage resides in the fact that a very close estimate of the number of each size of block required for each furnace can be accurately calculated, whereas it was heretofore a matter of guesswork for engineers to figure the approximate number of bricks required.

While I describe the invention as pertaining particularly to blast furnace construction, it is not confined to this specific use. I have also specifically described a particular plan for setting the straight bricks, but do not restrict myself to this particular and precise method of construction, as the bricklayer may proceed according to his best judgment. Neither do I wish the invention to be confined to particular dimensions, preferred dimensions having merely been given by way of illustration, and that instead of each straight block having a width equal to Pi. times an inch and a half, its width could equal Pi. times any fixed increment of diametrical increase. Various other changes and modifications are also within the spirit of my invention.

In the specification and claims, the term "course" is to be understood as a horizontal layer of blocks, and the term "row" is used to designate the concentric rings of blocks. In each row in each course there is always a set of key blocks, and these key blocks are sufficient, if laid side by side without straight blocks to always turn a circle, as will be readily understood from the foregoing description. The term "a set of key blocks," as hereinafter used in the claims, therefore means just the exact number of segmental blocks necessary for turning a circle to which the sides of the block are radial when the blocks are laid side by side without intervening straight blocks.

I claim as my invention:

1. A circular furnace wall construction of nonuniform diameter made up of blocks laid in horizontal courses, each course having a plurality of concentric rows of blocks, each row containing a complete set of key blocks having radial sides and which are segments of a circle, said set of key blocks being capable of turning a complete circle when laid side by side, the key blocks in the respective rows being segments of concentric circles, each row whose diameter is greater than the diameter of the circle of which its key blocks are segments having at least one straight-sided block therein, the number of key blocks in each of the rows of a course being equal and the number of straight-sided blocks in each row of a course also being equal, the width of the inner ends of the key blocks in each concentric row outwardly being the same as the outer width of the key blocks in the next adjacent inner row, the straight-sided blocks all having the same width, the blocks of each row of the same course being laterally offset with respect to the blocks of an adjacent row as to break joints, the blocks in each row of a course being laterally offset with respect to the corresponding rows of adjacent courses so as to break vertical joints therewith, and the blocks of each row of a course being of a length different from that of the blocks in the corresponding rows of the next adjacent courses so that the vertical joints between the ends of the blocks are broken.

2. A circular furnace wall construction of nonuniform diameter having blocks laid in horizontal courses, of a plurality of rows, each row containing a complete set of key blocks having radial sides and which are segments of a circle and are capable of turning a complete circle when laid side by side, the key blocks in the respective rows being segments of concentric circles, each row whose diameter is greater than the diameter of the circle of which its key blocks are segments, having at least one straight-sided block therein, the number of key blocks in the rows of each course being integral multiples of each other and the circumferential spaces filled by the straight blocks in each row of the course being equal, the blocks in each row of a course being offset with respect to the blocks of an adjacent row of the same course so as to break joints therewith, the blocks in a row of one course being offset laterally with respect to the blocks of the corresponding row of the next course so as to break vertical joints therewith, the blocks of each row of a course being of a length different from that of the blocks of the corresponding row in the next adjacent course, so that the joints between the ends of the blocks are broken vertically.

In testimony whereof I have hereunto set my hand.

WALLACE A. STUART.